United States Patent [19]

Doll et al.

[11] Patent Number: 5,694,398
[45] Date of Patent: Dec. 2, 1997

[54] NETWORK TERMINATION AND NETWORK TERMINATION ARRANGEMENT OF A TELECOMMUNICATIONS NETWORK

[75] Inventors: Reinhard Doll, Leonberg; Siegfried Schmoll, Hemmingen; Wolf Ohl, Korntal, all of Germany

[73] Assignee: Alcatel N.V., Rijswijk, Netherlands

[21] Appl. No.: 653,068

[22] Filed: May 31, 1996

Related U.S. Application Data

[63] Continuation of Ser. No. 388,352, Feb. 14, 1995, abandoned.

[30] Foreign Application Priority Data

Feb. 17, 1994 [DE] Germany .............. 44 05 038.0
Feb. 17, 1994 [DE] Germany .............. 44 05 037.2

[51] Int. Cl.$^6$ ..................................... H04L 12/52
[52] U.S. Cl. ...................... 370/524; 379/229; 379/322
[58] Field of Search ...................... 370/437, 438, 370/442, 465, 498, 522, 524, 904; 379/220, 221, 229, 231, 322, 323, 327

[56] References Cited

U.S. PATENT DOCUMENTS

| | | | |
|---|---|---|---|
| 4,779,071 | 10/1988 | Guglielmo | 340/310 |
| 4,806,905 | 2/1989 | McGowan, III et al. | 340/310 |
| 5,157,599 | 10/1992 | Miyamoto | 358/471 |
| 5,181,106 | 1/1993 | Sutherland | 358/86 |
| 5,305,312 | 4/1994 | Fornek et al. | 370/110.1 |
| 5,398,249 | 3/1995 | Chen et al. | 370/110.1 |
| 5,408,528 | 4/1995 | Carlson et al. | 370/110.1 |

FOREIGN PATENT DOCUMENTS

| | | |
|---|---|---|
| 3112847 | 2/1983 | Germany . |
| 3316470 | 11/1984 | Germany . |
| 3316492 | 11/1984 | Germany . |
| 3317385 | 8/1986 | Germany . |
| 3642019 | 12/1988 | Germany . |
| 3803710 | 8/1989 | Germany . |
| 3438340 | 1/1992 | Germany . |
| 4038749 | 2/1992 | Germany . |
| 4124118 | 1/1993 | Germany . |

OTHER PUBLICATIONS

"Der Basisanschluss im Breitband-ISDN", R.Pospischil et al, *NTZ*, vol. 39 (1986), No. 12, pp. 810–816.

"ISDN-Schnittstelle und Endgerate", A. Reinhold, *Telematica*, pp. 336–350.

P. Kahl, "ISDN-Das künftige Fernmeldenetz der Deutschen Bundespost", R.v. Decker's Verlag, G. Schenck, Heidelberg 1985, pp. 85–115.

"Wirtschaftlicher Zugang zum ISDN", H. Seidel et al, *Telcom Report*, No. 12 (1989), No. 1-2, pp. 14–17.

"Stromversorgung von Zusatzgeräten am ISDN-Hauptanschluss", D. Klein, *NTZ*, No. 41 (1988), No. 10, pp. 566–569.

(List continued on next page.)

*Primary Examiner*—Douglas W. Olms
*Assistant Examiner*—Ricky Q. Ngu

[57] ABSTRACT

A network termination (NT) with a network interface ($U_{KO}$), several subscriber interfaces ($S_O1$, $S_O2$), a control unit (CPU) and an internal bus (IBUS) is indicated for a telecommunications network. Information is transmitted on the network side in a frame structure by the time division multiplex method. The frame structure contains several useful information channels and one or more signaling channels. The control unit (CPU) assigns the useful information channels to the terminals in such a way, that each terminal has at least one channel available for the transmission of useful information. In addition, the network terminations (NT) of several subscribers are combined in the circuit of a network termination arrangement (NTE) outside of the subscribers' premises, and is jointly supplied by a voltage transformer (ACDC). A power supply that is independent of the telecommunications network supplies the voltage transformer (ACDC).

21 Claims, 3 Drawing Sheets

OTHER PUBLICATIONS

"ISDN: Die S₀-Schittstelle, ein universeller Anschluss für Teilnehmerendgerate", H. Untergerger, *Elektronik Industrie* No. 2, 1987, pp. 74–78.

"INOBA—Intelligent Node for ISDN Basic Access", J. Loscher et al, *Philips Telecommunication Review*, vol. 49, No. 3, Sep. 1991, pp. 42–47.

"Der Basisanschluss im ISDN", H. Hofmeister, *NTZ*, vol. 39 (1986), No. 12, pp. 818–827.

"Basics of Protocols: Terminology, Use and Meaning", L. Lindquist, *Proceedings of the National Communications Forum*, 43 (1989), Oct. 2/4, Chicago, pp. 416–426.

"Planning of ISDN", A. Rudberg et al, *Ericsson Review*, 61 (1984), May, ISDN, Stockholm, pp. 34–41.

"Exploiting the Copper Network", P. Lisle et al, *British Telecommunications Engineering*, vol. 10, Apr. 1991, pp. 26–33.

K. Bergmann et al, "Lehrbuch der Fernmeldetechnik", Fachverlag Schiele & Schon GmbH, Berlin, 1986, pp. 1332–1336.

G. Siegmund, "Grundlagen der Vermittlungstechnik", Standard Elektrik Lorenz AG, R. v. DEcker's VErlag, G. Schenck GmbH, Heidelberg (1991), pp. 166–167.

"A Line Termination Unit for Primary Rate B–channel Access with Optical Fibre", H. Götz et al, *Philips Telecommunication Review*, 49 (1991) No. 2, Hilversum, NL, pp. 26–32.

"ISDN–Schnittstelle und Endgerate", A. Reinhold, *Kongressband Telematica 88*, Nov. 1989, pp. 336–350.

"Basics of Protocols: Terminology, Use and Meaning", L. Lindquist, *Proceedings of the National Communications Forum*, Oct. 2–4, 1989, Chicago IL, vol. 43, No. 1, pp. 416–426.

"Planning of ISDN", A. Rudberg et al, *Ericsson Review*, No. ISDN, 1984, vol. 61, pp. 34–41.

"Exploiting the Copper Network", P. Lisle et al, *British Telecommunications Engineering*, vol. 10, Apr. 1911, pp. 26–33.

"A Line Termination Unit for Primary Rate B–Channel Access with Optical Fibre", J. Gotz et al, *Philips Telecommunication Review*, vol. 49, No. 2, Jun. 1991, pp. 26–32.

P. Kahl, "ISDN, Das kunftige Fernmeldenetz der Deutschen Bundespost", R.v.Decker's Verlag, G. Schenck, Heidelberg 1985, pp. 58–62, 82, 114.

"Wirtschaftlicher Zugang zum ISDN", H. Seidel et al, *Telcom Report* 12 (1989) vol. 1–2, pp. 14–17.

"Stromversorgung von Zusatzgeraten am ISDN–Hauptanschluss", D. Klein, *ntz Bd* 41 (1988), vol. 10, pp. 566–569.

NETWORK TERMINATION AND NETWORK TERMINATION ARRANGEMENT OF A TELECOMMUNICATIONS NETWORK

This application is a continuation of application Ser. No. 08/388,352 filed on Feb. 14, 1995, now abandoned.

TECHNICAL FIELD

The invention concerns a network termination, a network termination arrangement and a remote field termination unit of a telecommunications system network, a telecommunications system as well as a method to that effect.

Pages 1332 to 1336 of volume 2 of the 1986 "Textbook of Telecommunications" describes a telecommunications network assembly with network terminations, terminals and remote field units. Each terminal, i.e. each subscriber, is connected with a separate network termination, which is located on the subscriber's premises. Since each network termination needs a power supply, each network termination must be equipped with its own power supply on the subscriber's premises.

Page 166 of the 1991 book "Basic Switching Techniques" by G. Siegmund describes the basic connection configuration of an integrated services digital network (ISDN). In it, a terminal is connected to the service-integrating digital network through a network termination. The network termination has an $S_O$-interface on the subscriber side and a $U_{KO}$-interface on the network side. On the network side and on the subscriber side, the information is always transmitted in a frame structure through a time division multiplex method. Both frame structures contain respectively two B channels (64 kbit/s) and a D channel (16 kbit/s). The basic connection configuration is a rigid configuration, since it makes the same transmission capability available to each terminal, namely 2×64 kbit/s +1×16 kbit/s.

The publication DE 41 24 118 A1 describes a telecommunications concept with a concentration of eight analog subscribers in a basic ISDN connection. The eight analog subscribers are connected to the basic ISDN connection through a multiplexer. Controlled by a switching technique, only two of the eight analog subscribers can simultaneously transmit information through the two B channels of the basic ISDN connection. This is a rigid concept, which makes the same transmission capability available to each subscriber and is furthermore limited to analog subscribers.

DISCLOSURE OF INVENTION

It is therefore the task of the invention to assign useful information channels to terminals in a more flexible manner.

According to the invention, a network termination for connecting one or more subscriber terminals to a digital telecommunications network comprises a U interface on a network side, two or more S interfaces on a subscriber side, a control unit connected to the network side U interface and the one or more subscriber side S interfaces by an internal bus for the transmission of frame-structured information, wherein a network-side frame contains several useful information channels and one or more signaling channels, wherein only a portion of the useful information channels that are available on the network side can be assigned to the control unit or to the one or more terminals in accordance with a predetermined distribution.

According further to the invention, a network termination arrangement for terminating a digital telecommunications network comprises several network terminations as described above and further comprises a voltage transformer fed by a power supply that is independent of the digital telecommunications network for providing power for the several network terminations.

In further accord with the invention, a remote field termination unit comprises a network termination arrangement as described above and further comprises a remote field unit and a common power supply for supplying the network termination arrangement and the remote field unit.

According still further to the invention, a method of assigning useful information channels to terminals comprises the steps of connecting the terminals to a digital telecommunications network, transmitting frame-structured information in useful information channels and signaling channels between the terminals and the digital telecommunications network, and assigning only a portion of the useful information channels available in network terminations of the telecommunications network to each of the terminals according to a predetermined distribution.

In further accord with the invention, a telecommunications system comprises an exchange, several network terminations and several terminals for connection to said at least one exchange through the network termination, wherein the network terminations process frame-structured information with frames containing several useful information channels and at least one signaling channel and wherein only a portion of the useful information channels available in the respective network terminations are for assignment to the terminals in accordance with a predetermined distribution.

A particular advantage of the invention lies in the increase of subscriber capability in a telecommunications network without the expensive installation of new main cables. In addition, advantages can be expected during the installation and operation of terminals.

Furthermore, the interconnection of several network terminations produces servicing advantages.

The above described connection of terminals to an existing telecommunications network results in increased station line capacity, lower installation cost per terminal, lower operating cost per terminal, greater acceptance by the customer because charges for being connected are reduced, for example, to one-half, and a smaller amount of circuitry is required for network terminations.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
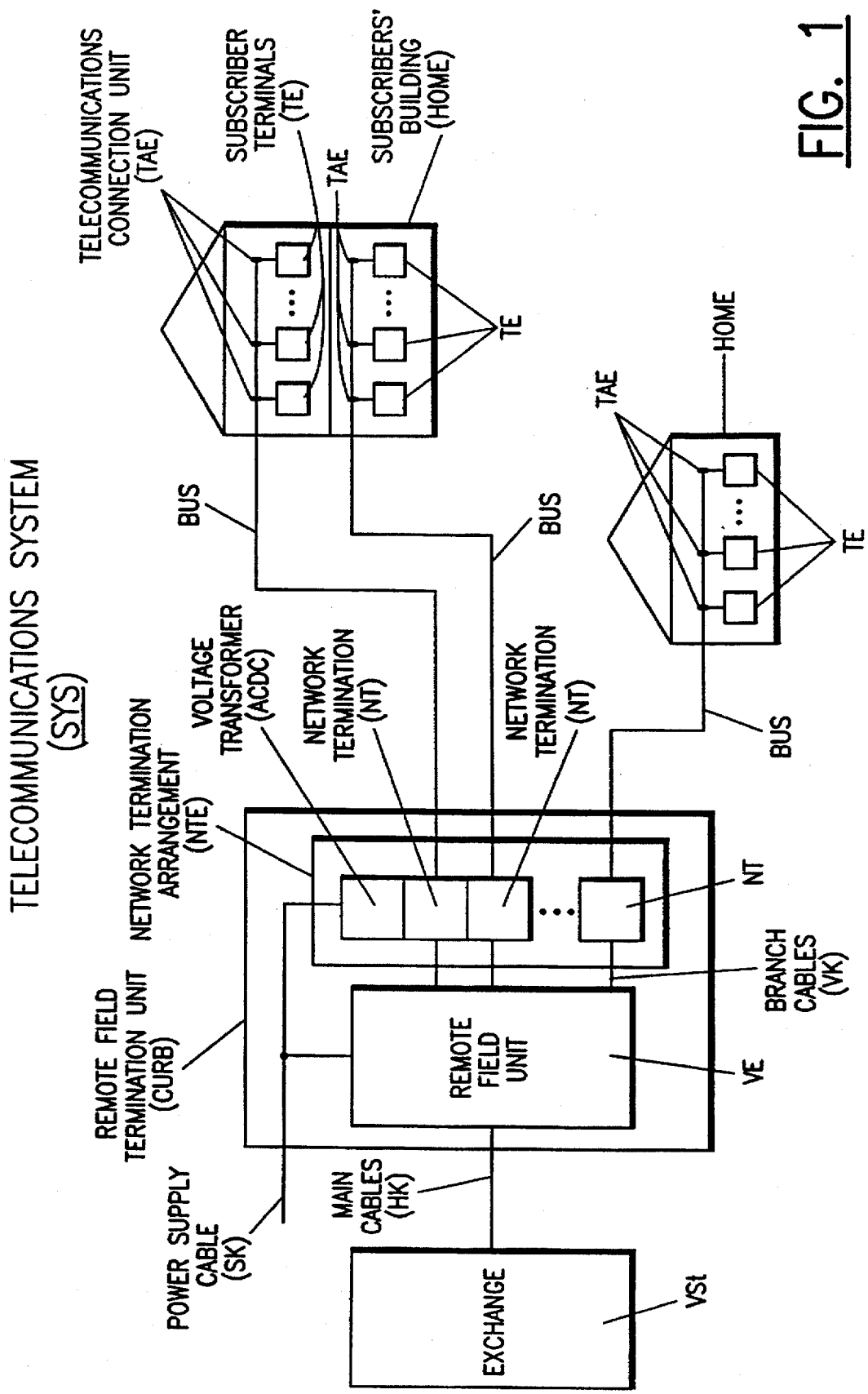
FIG. 1 is a schematic illustration of a telecommunications system according to the invention, with a network termination arrangement.

A configuration example of the invention will now be described by means of FIGS. 1, 2 and 3. FIG. 1 illustrates a configuration example of a telecommunications system SYS with a network termination arrangement NTE, a BUS on the subscriber side and VK connections on the network side. The power supply lines inside the network termination arrangement NTE have not been drawn for reasons of clarity.

The configuration example contains a service-integrating digital network ISDN as the telecommunications network. The invention can also be used with a different network than the ISDN.

The network termination arrangement NTE comprises a voltage transformer ACDC and several network terminations NT. The voltage transformer ACDC is fed by a power supply cable SK from a power supply that is independent of the telecommunications network, and transforms an incoming AC voltage into several outgoing DC voltages. The outgoing DC voltages serve to supply the network terminations NT, and also supply one or more subscriber terminals TE via the network terminations NT.

On the network side, the network termination arrangement NTE is connected to a remote field unit VE through several branch cables VK. The remote field unit VE is also supplied by the power supply cable Sk from the power supply that is independent of the telecommunications network. The remote field unit VE may be a cable distribution box or a distributor, for example. The network termination arrangement NTE and the remote field unit VE are combined into a remote field termination unit CURB. There, the network termination arrangement NTE and the remote field unit VE are located in a common housing. The combination into a remote field termination unit CURB is advantageous for remotely supplied remote field units VE, i.e. remote field units that are supplied through the telecommunications network, such as e.g. cable distribution boxes or distributors, in that the remote field unit VE can also be supplied in this instance by the power supply cable SK available through the network termination arrangement NTE, and the remote supply can be omitted. The network termination arrangement NTE and the remote field unit VE can also be located in separate housings. This is advantageous for more complex remote field units VE, such as multiplexers, concentrators or digital multi-service modules, to suppress high heat development which can impair the function of the network terminations.

The remote field unit VE is connected to an exchange VSt by one or more main cables HK, and possibly by intermediate installations not illustrated here. The main cable HK, branch cable VK and terminal lines BUS may be copper cables or optical waveguide cables. Optical-electrical converters are necessary in transitions between optical waveguide cables and copper cables, thus e.g. optical/ electrical converters are required in the remote field unit VE as main cables HK in optical waveguide cables and as branch cables VK in copper cables.

On the subscriber side, the network termination arrangement NTE is connected to the terminals TE of individual subscribers through terminal lines BUS and telecommunications connection units TAE. The network termination arrangement NTE is located outside of the subscriber's premises and even outside of the subscribers' building (HOME) in the case of a small number of subscribers. With a larger number of subscribers, the network termination arrangement NTE as well as the remote field unit VE can be located inside the subscribers' building (HOME). Different configurations are required for the terminal lines BUS depending on the distance and the number of terminal connections. With one terminal connection, i.e. one telecommunications connection unit TAE per subscriber, the terminal line BUS is a point-to-point connection. With several terminal connections per subscriber and a distance of several hundred meters between subscriber and network termination arrangement NTE, the terminal line BUS is an expanded BUS. With several terminal connections per subscriber and a distance up to a few hundred meters between subscriber and network termination arrangement NTE, the terminal line BUS is a passive BUS.

Figure 2:
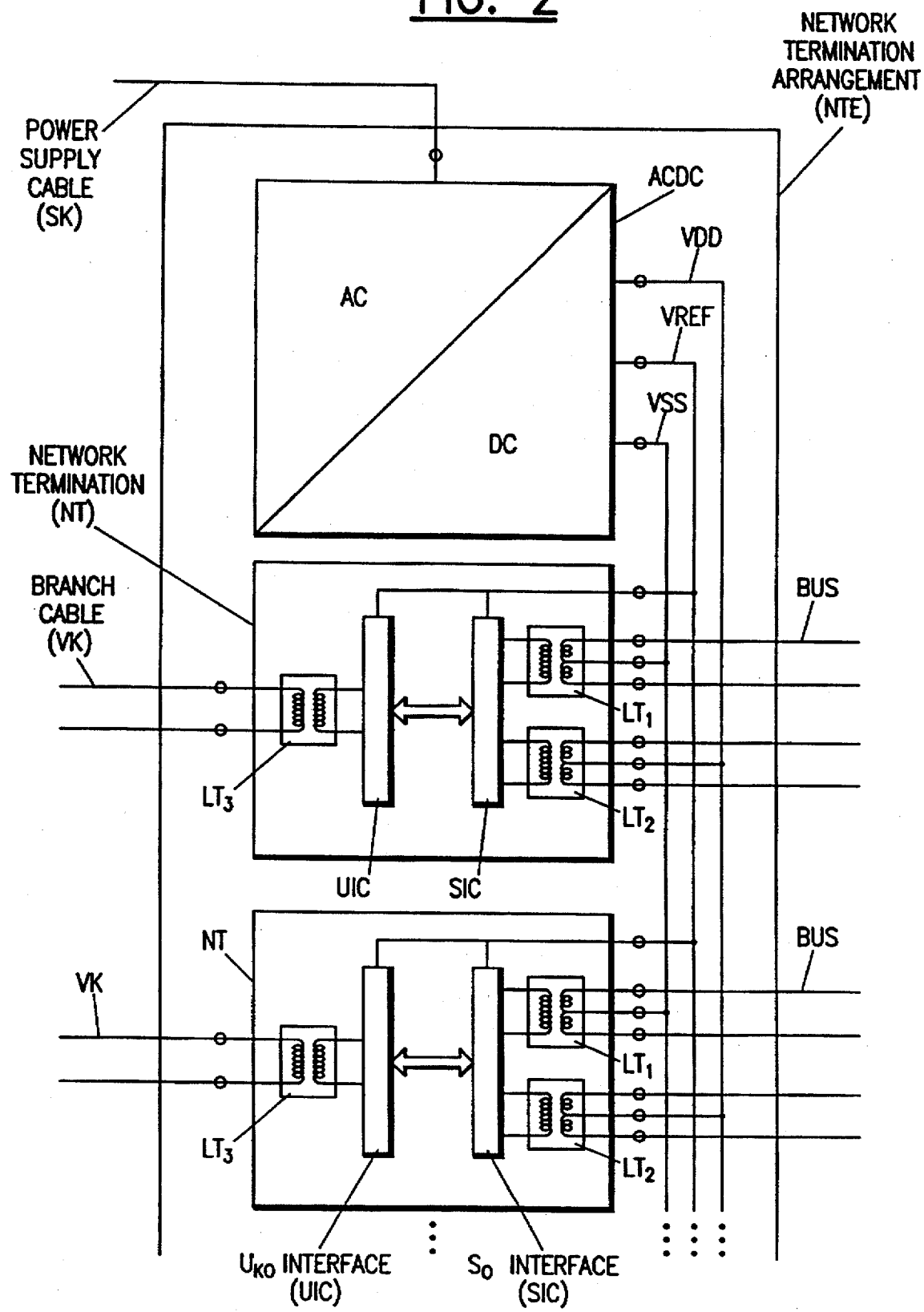
FIG. 2 is a schematically illustrated assembly of the network termination arrangement according to the invention.

FIG. 2 now illustrates the wiring arrangement of the power supply lines in a network termination arrangement NTE of a telecommunications network according to the invention.

Only such units as are essential to explain the wiring arrangement of the power supply lines are indicated inside the network terminations. The network terminations to be described correspond to those of the basic ISDN connection configuration. The invention can also be applied to other network terminations, such as e.g. those in FIG. 3.

A voltage transformer ACDC transforms an AC voltage supplied by the power supply cable SK into two outgoing DC voltages; a high outgoing DC voltage with a positive supply voltage VDD and a negative supply voltage VSS for the remote supply of the terminals TE, and a low outgoing DC voltage VREF to supply the active units of network terminations NT.

Each of the network terminations NT comprises three line transformers $LT_1$, $LT_2$, $LT_3$ and a $U_{KO}$ interface circuit UIC and a $S_O$ interface circuit SIC. The $U_{KO}$ interface circuit UIC and the $S_O$ interface circuit SIC are interconnected by a bidirectional bus and have a common power supply connection. On the network side, the $U_{KO}$ interface circuit UIC is connected to the remote field unit VE through a line transformer $LT_3$. On the subscriber side, the $S_O$ interface circuit SIC is connected to connectors for the terminals of subscribers through two line transformers $LT_1$ and $LT_2$. The low outgoing DC voltage VREF produced by voltage transformer ACDC is supplied to the $U_{KO}$ interface circuits UIC and the $S_O$ interface circuits SIC of several network terminations NT. One or more subscriber terminals are supplied through a phantom connection from central taps on the subscriber side of the two line transformers $LT_1$ and $LT_2$ connected to the $S_O$ interface circuit SIC. The supply voltage for the phantom connection is the high outgoing DC voltage VDD, VSS produced by voltage transformer ACDC.

Figure 3:
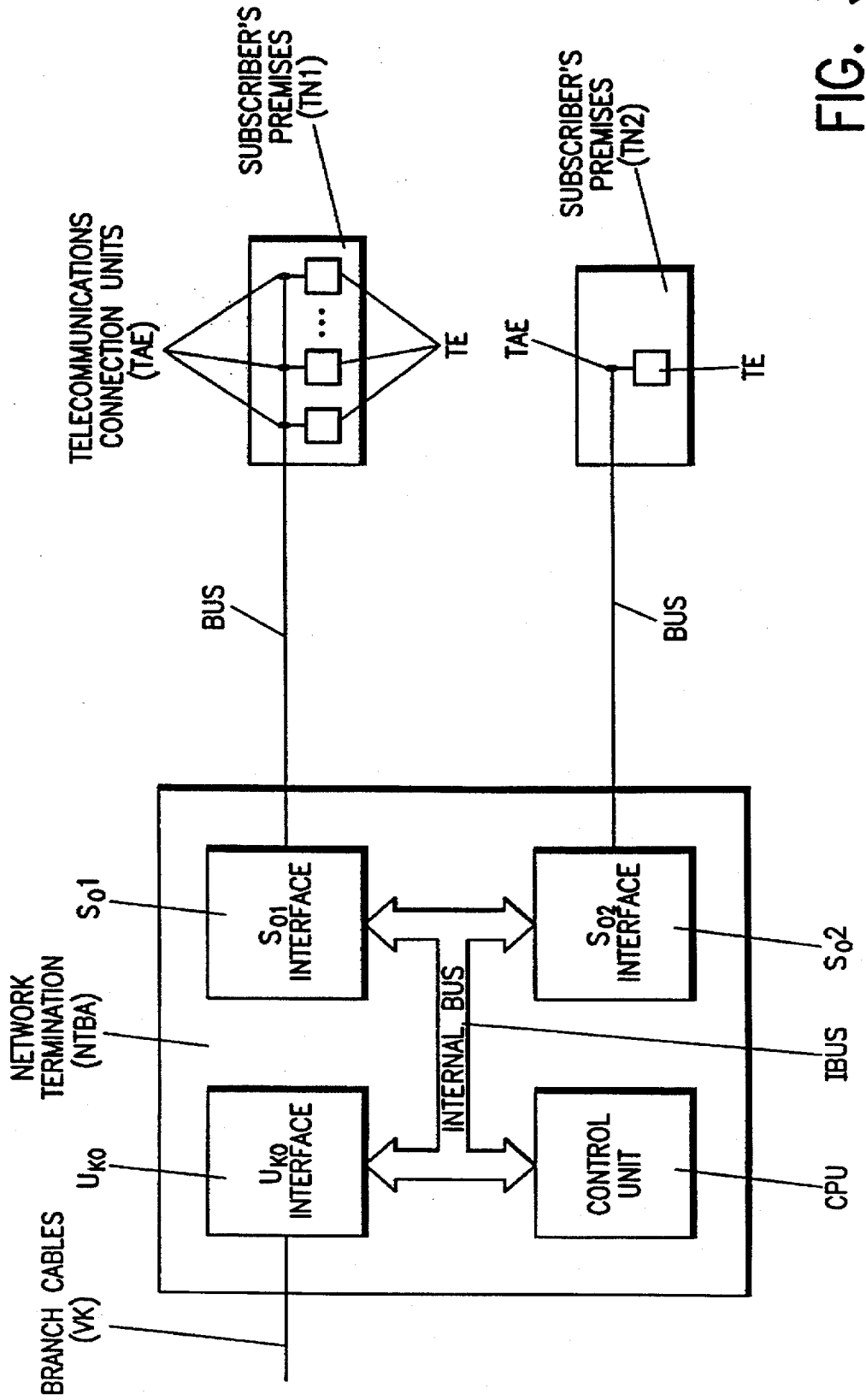
FIG. 3 is a schematic illustration of a network termination of the network termination arrangement according to the invention.

FIG. 3 illustrates a network termination NT according to the invention of a integrated services digital network (ISDN), its subscriber-side and network-side connections BUS, VK, and the process of the information transmission from the integrated services digital network to the terminals. The power supply lines inside the network termination NT have not been drawn for reasons of clarity.

The network termination NT contains a $U_{KO}$ interface circuit $U_{KO}$ for network-side connections, two $S_O$ interface circuits $S_O1$, $S_O2$ for subscriber-side connections, a control unit CPU and an internal bus IBUS. The $U_{KO}$ interface circuit $U_{KO}$, the two $S_O$ interface circuits $S_O1$, $S_O2$ and the control unit CPU are interconnected through the internal bus IBUS. The internal bus IBUS transmits bidirectional information.

On the network side, the network termination NT is connected to the remote field unit VE through two branch cables VK.

On the subscriber side, the network termination NT is connected to two terminals. Each terminal, i.e. each subscriber is connected to the network termination NT by a separate $S_O$ interface circuit $S_O1$; $S_O2$. Each terminal contains a terminal line BUS and one or more telecommunications connection units TAE. In each instance, the terminals TE of the subscribers are connected with the respective $S_O$ interface circuit $S_O1$, $S_O2$ through the telecommunications connection units TAE and the terminal line BUS.

The network termination NT is located outside of the subscribers' premises TN1, TN2. It is supplied by a power supply that is independent of the telecommunications network (compare FIG. 2).

When information is transmitted from the integrated services digital network to the terminals, the information is first transmitted to the $U_{KO}$ interface circuit $U_{KO}$. The information is transmitted in a frame structure by the time division multiplex method. The frame structure contains two B channels (64 kbit/s) and a D channel (16 kbit/s). The B channels then contain useful information, such as e.g. speech, text, data, pictures. The D channel contains signaling information. Among other things, the signaling information serves to establish and cut the connections with terminals through the integrated services digital network. Information regarding a partition and an assignment of the B channels to the two terminals is added to the signaling information in the D channel. To that end, one bit is provided for the selection of the terminal and one bit for the assignment of one B channel per terminal. The assignment of the B channels to the two terminals can take place e.g. through the European digital signaling system "Protocol No. 1" (EDSS1-Protocol), for the D channel by means of the service attribute multiple calling number (MSN).

The assignment of the B channels is determined by the exchange (VSt). The information from the B channels and the D channel is transmitted to the control unit CPU. The control unit CPU is a processor, for example. It evaluates the signaling information from the D channel and only transmits the pertinent user and/or signaling information to each terminal through the respective $S_O$ interface $S_O1$; $S_O2$. Thus, each terminal is assigned a B channel with 64 kbit/s for the transmission of useful information, and the D channel in the time division multiplex for the transmission of signaling information. In addition, the D channel can be used by one or the other terminal in the time division multiplex for transmitting packet-switched data. In this way, each terminal can use two channels, one 64 kbit/s channel and one 16 kbit/s channel for the simultaneous transmission of useful information, such as e.g. speech and data.

When information is transmitted from the terminals to the service-integrating digital network, the information is first transmitted from the terminals to the control unit CPU through the respective $S_O$ interface $S_O1$; $S_O2$. The control unit CPU bundles the subscriber-specific information and transmits it to the service-integrating digital network through the $U_{KO}$ interface. The signaling information and the packet-switched data from one terminal, and those from the other terminal, are then transmitted in the D channel by the time division multiplex method. The useful information from one of the terminals is transmitted in one of the B channels, the useful information from the other terminal is transmitted in the other B channel, while the assignment is made in accordance with a previous specification from the exchange VSt.

The network termination NT can also be connected to only one terminal. In that case, one of the two $S_O$ interfaces $S_O1$; $S_O2$ is not used. The terminal can then optionally be assigned one or two user information channels for the transmission of information.

In the configuration example, a service-integrating digital network (ISDN) is used as a telecommunications network. In that case, information is always transmitted through the network terminations NT in a frame-structure containing two useful information channels and one signaling channel. The invention can also be used with a network that is different from the service-integrating digital network. The other network can contain a frame-structure with more than two useful information channels and possibly also more than one signaling channel. In this way, more than two terminals e.g. could be connected to one network termination NT, or increased transmission capability could be made available to two terminals.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Network termination (NT) for connecting one or more subscriber terminals (TE) via corresponding telecommunications connection units (TAE) to an integrated services digital network (ISDN) that provides access to at least two communication channels for voice or data, and at least one signaling channel, the network termination (NT) comprising a network-side interface, at least two subscriber-side interfaces which are connected to the network-side interface by an internal bus, and which each provide access to an external bus, and a control unit (CPU) connected to the network-side interface and the at least two subscriber-side interfaces by the internal bus for transmission of frame-structured information, wherein a network-side frame contains at least two communication channels and, in addition, at least one signaling channel, and wherein the at least two communication channels provided through the network-side interface are apportioned among the at least two subscriber-side interfaces in accordance with a predetermined distribution, including an apportionment in which the at least two subscriber-side interfaces share, in a time division multiplexed way, the at least one signaling channel, thereby providing that each of the at least two subscriber-side interfaces have simultaneous access to a same signaling channel.

2. Network termination as claimed in claim 1, wherein, in addition to signaling information contained in the signaling channels, information for selecting the terminal (TAE, TE) and for selecting the useful information channels is evaluated by the control unit (CPU).

3. Network termination as claimed in claim 1, wherein the network termination (NT) is located outside of subscriber premises (TN1, TN2) within which the subscriber terminals (TAE, TE) are located.

4. Network termination as claimed in claim 1, wherein at least one subscriber-side interface is an $S_O$-interface and the interface on the network side is a U-interface of the integrated services digital network.

5. Network termination as claimed in claim 4, wherein each of the useful information channels has a transmission capability of 64 kbit/s.

6. Network termination as claimed in claim 4, wherein at least one signaling channel of the signaling channels has a transmission capability of 16 kbit/s.

7. Network termination as claimed in claim 4, wherein the signaling channels can also be used by the one or more terminals (TAE, TE) for the transmission of packet-switched data through the control unit (CPU).

8. Network termination arrangement (NTE) to terminate an integrated services digital network (ISDN) with several network terminations (NT), the integrated service digital network providing access to at least two communication channels for voice or data, and at least one signaling channel, and each network termination for connecting one or more subscriber terminals (TE) via corresponding telecommunications connection units (TAE) to the integrated services digital network (ISDN) that provides access to at least two communication channels for voice or data, and at least one signaling channel, each network termination (NT) comprising a network-side interface, at least two subscriber-side interfaces which are connected to the network-side interface by an internal bus, and which each provide access to an external bus, and a control unit (CPU) connected to the network-side interface and the at least two subscriber-side interfaces by the internal bus for transmission of frame-structured information, wherein a network-side frame contains at least two communication channels and, in addition, at least one signaling channel, and wherein the at least two communication channels provided through the network-side interface are apportioned among the at least two subscriber-side interfaces in accordance with a predetermined distribution, including an apportionment in which the at least two subscriber-side interfaces share, in a time division multiplexed way, the at least one signaling channel, thereby providing that each of the at least two subscriber-side interfaces have simultaneous access to a same signaling channel, said network termination arrangement further comprising a voltage transformer (ACDC) fed by a power supply (SK) that is independent of the ISDN for providing power for said several network terminations (NT).

9. Network termination as claimed in claim 8, wherein it contains optical/electrical converters.

10. Remote field termination unit (CURB) with a network termination arrangement (NTE) as claimed in claim 8, a remote field unit (VE) and a common power supply (SK) to supply the network termination arrangement (NTE) and the remote field unit (VE).

11. Remote field termination unit as claimed in claim 10, wherein the remote field unit (VE) contains optical/electrical converters.

12. Remote field termination unit as claimed in claim 10, wherein the remote field unit (VE) is a cable distribution box.

13. Remote field termination unit as claimed in claim 10, wherein the remote field unit (VE) is a distributor.

14. Remote field termination unit as claimed in claim 10, wherein the network termination arrangement (NTE) and the remote field unit (VE) are located in a housing.

15. Method of assigning at least two communication channels and at least one signaling channel to at least two terminals, comprising the steps of:
  (i) connecting the terminals to an integrated services digital network by means of a network termination of the integrated services digital network,
  (ii) transmitting frame-structured information in the at least two communication information channels and the at least one signaling channel between the network and the terminals,
  (iii) assigning only a portion of the at least two communication channels available in the network termination of the integrated services digital network to each of the terminals according to a predetermined distribution wherein the at least two communication channels are apportioned among the at least two terminals in accordance with a predetermined distribution, including an apportionment in which the at least two terminals share, in a time division multiplexed way, the at least one signaling channel, thereby providing that each of the at least terminals have simultaneous access to a same signaling channel.

16. Method as claimed in claim 15, wherein the step of assigning takes place through an exchange (VSt).

17. Method as claimed in claim 15, wherein the at least two communication channels are assigned to the network termination through control units (CPU).

18. Method as claimed in claim 15, wherein selection of the terminal and the assignment of the at least two communication channels is made through additional information in a signaling channel.

19. Telecommunications system (SYS) comprising: at least one exchange (VSt), several network terminations (NT) and several terminals (TE), where the terminals (TE) are connected via corresponding telecommunications connections (TAE) to said at least one exchange through the network terminations (NT), where the network terminations (NT) each connect one or more subscriber terminals (TE) via corresponding telecommunications connection units (TAE) to an integrated services digital network (ISDN) that provides access to at least two communication channels for voice or data, and at least one signaling channel, each network termination (NT) comprising a network-side interface, at least two subscriber-side interfaces which are connected to the network-side interface by an internal bus, and which each provide access to an external bus, and a control unit (CPU) connected to the network-side interface and the at least two subscriber-side interfaces by the internal bus for transmission of frame-structured information, wherein a network-side frame contains at least two communication channels and, in addition, at least one signaling channel, and wherein the at least two communication channels provided through the network-side interface are apportioned among the at least two subscriber-side interfaces in accordance with a predetermined distribution, including an apportionment in which the at least two subscriber-side interfaces share, in a time division multiplexed way, the at least one signaling channel, thereby providing that each of the at least two subscriber-side interfaces have simultaneous access to a same signaling channel.

20. Telecommunications system as claimed in claim 19, wherein the at least two communication channels for voice or data are assigned through the exchange.

21. Telecommunications system as claimed in claim 19, wherein said network termination arrangement further comprises a voltage transformer (ACDC) fed by a power supply (SK) that is independent of the integrated services digital network for providing power for said several network terminations (NT).

* * * * *